United States Patent [19]

Gross

[11] 3,839,729

[45] Oct. 1, 1974

[54] METHOD AND APPARATUS FOR COMPENSATING SIGNALS FOR FREQUENCY DEVIATIONS

[75] Inventor: Thomas Alfred Otto Gross, Lincoln, Mass.

[73] Assignee: Polaroid Corporation, Cambridge, Mass.

[22] Filed: Oct. 2, 1972

[21] Appl. No.: 294,318

[52] U.S. Cl. .......................... 360/27, 360/24, 360/30

[51] Int. Cl. ............................................ G11b 5/04

[58] Field of Search... 179/100.1 R, 100.4 M, 100.2 K, 179/100.2 E, 100.2 S; 178/6.6 A

[56] References Cited

UNITED STATES PATENTS

| | | | |
|---|---|---|---|
| 2,668,283 | 2/1954 | Mullin | 179/100.1 R |
| 2,685,079 | 7/1954 | Hoeppner | 179/100 R |
| 3,723,643 | 3/1973 | Suzuki et al. | 178/6.6 A |

*Primary Examiner*—Bernard Konick
*Assistant Examiner*—David K. Moore
*Attorney, Agent, or Firm*—John W. Ericson

[57] ABSTRACT

A method and apparatus for compensating signals for frequency deviation in which a pilot frequency is recorded with the information signal. Upon reproduction, the information signal is modulated with a signal derived from the pilot frequency to produce a side band in which frequency deviation components introduced in recording and reproduction are absent.

In one embodiment, the reproduced pilot signal is modulated with a signal at a fixed frequency and the frequency of a selected side band of the resultant signal is multiplied by the ratio of the center frequency of the information signal to the pilot frequency to produce a control signal containing frequency deviation components resulting from recording and reproduction that are approximately equal to the corresponding frequency deviations in the information signal. This control signal modulates the information signal to produce one side band in which the frequency deviation component is doubled and a second side band in which the frequency deviation components are cancelled. The second side band is rejected by filtering, and modulated by another signal at a fixed frequency to produce, as the desired component, a side band which has the center frequency of the original information signal and contains the original information as a modulation on that signal. The desired component is selected by filtering as the compensated output signal.

31 Claims, 4 Drawing Figures

METHOD AND APPARATUS FOR COMPENSATING SIGNALS FOR FREQUENCY DEVIATIONS

This invention relates to the reproduction of recorded signals, and particularly to a novel system for compensating a recorded signal for deviations in frequency experienced during recording and reproduction.

In the recording and reproduction of signals by moving a transducer such as a magnetic head, a piezoelectric crystal, a variable intensity light beam, an electron beam, or the like, relative to a record medium, the density of the recorded signal depends upon the speed of the transducer relative to the record, as well as on the frequency of the input signal. On reproduction, by sweeping a transducer over the record, the frequency of the output signal is thus determined by the speed of the transducer relative to the record, as well as by the original information signal frequencies. Information so recorded and reproduced thus usually experiences frequency deviations from the original signal which are more or less tolerable depending on the use to which the reproduced signal is to be put.

Various causes of these deviations can produce either a constant difference in frequency between the recorded and reproduced signal, a continually changing difference between these frequencies, or a more or less periodic cyclic variation in the difference between the frequencies. Any substantial constant difference between recorded and reproduced frequencies can usually be taken care of in design, by adjusting the recording speed to the reproducing speed, as by the use of a synchronous motor or the like. Continual unidirectional changes in frequency are not usually encountered, except as transients during acceleration and deceleration of the transducer relative to the record.

Cyclic changes in frequency are usually conventionally divided into two more or less overlapping categories. Deviations in the range from 0 to 1 cycles per second, for example, are commonly termed "wow," whereas deviations between 1 and 100 cycles or more per second are conventionally termed "flutter." The effects of wow and flutter on the sound of recorded music are not so drastic that moderate amounts cannot be tolerated, although precision turntables are employed where high fidelity is a requirement.

However, wow and flutter are especially serious in the reproduction of carrier signals, frequency modulated at low information signal frequencies. Such signals would normally be preferred over amplitude modulated carriers for many purposes, as to record and reproduce transducer signals repeating conditions that change relatively slowly; i.e., the output of a cardiac monitor, a temperature recorder, a position transducer, or the like. The low frequencies at which such variables change are in the range effected by wow and flutter, and for the most part it has not been found very practical to record and reproduce such signals because of the difficulty of making a practical recorder in which wow and flutter are so reduced as not to affect this kind of signal. The principal object of the invention is to facilitate the recording and reproduction of signals in which frequency deviations such as wow and flutter may be encountered.

A particular object of the invention is to facilitate the recording and reproduction of handwriting. Facsimile transmitters and receivers have been developed with which handwriting with a stylus at a transmitter location is transformed, by transducers connected to the stylus, into position signals which are transmitted to a receiver that then activates a second stylus to reproduce the original writing or drawing on a record sheet. This apparatus has been successfully employed with directly wired transmitting and receiving stations, as for the transmission of handwritten orders to a remote location, and has also been used to transmit handwriting over the telephone. However, for many purposes, it would be desirable to record handwritten signals produced by a facsimile transmitter so they can be later reproduced.

Various efforts have been made to effectuate such recordings, but so far as is known, prior to this invention no really successful approach has been found. By utilizing a very costly precision recorder, a result can be demonstrated, but is has not been found practical to use such recordings on even reasonably good apparatus with what is generally considered quite a low level of wow and flutter. It has been proposed to eliminate wow and flutter by using a servomechanism to control the playback speed, but at the usual flutter frequencies in the range from, say, 20 to 100 cycles per second, elaborate and powerful servomechanisms would be required in order to follow the error.

Various compensation schemes have been proposed, in which a reference signal is recorded with the information signal. Circuits employing variable delay lines or voltage controlled oscillators in phase locked loops have been proposed for use in eliminating the effects of wow and flutter in an information signal by comparison with the error found between a simultaneously recorded pilot signal and a reference signal. In theory, such apparatus will make the desired correction, but in practice, either a variable delay line or a voltage controlled oscillator is difficult to adjust and maintain so that useful standards of performance can be maintained from unit to unit and from day to day in a given unit.

Various digital systems have been proposed for use with recorded digital signals, as in computer applications or the like. However, such apparatus is generally costly, complex and but ill-suited to use for analog signals.

A particular object of the invention is to provide a compensator for wow and flutter which will be adapted to quantity production and to be stable in performance during operation without requiring precision recorders, complex servomechanisms, or extensive maintenance.

Briefly, the above and other objects of the invention are attained by a recording and reproducing system in which one or more information signals are recorded simultaneously with a reference signal, either in superposition on a record or on different zones of a record. A compensator is provided which is adapted to receive signals from the record on playback.

The compensator comprises filters for separating the reference frequency from the information frequencies, and, if there is more than one information frequency, filters for separating these from each other. Generally speaking, these filters are band pass filters having pass bands sufficient to accommodate the selected center frequency together with its deviations, either arising by original modulation or from the effects of wow and flutter.

A modulator supplied with a modulating signal from a local oscillator is employed to modulate either the reference frequency, or each of the information frequencies, with a standoff frequency to produce a modulated signal containing two side bands. If this signal is produced by modulation of the reference frequency, one of these side bands is used to modulate each information signal frequency. Alternatively, if produced by modulating the information signal frequencies, a selected side band from the modulation product of each information signal is modulated with the reference frequency.

The modulation product contains one side band in which the noise frequency components cancel, and another in which they are enhanced. That side band in which the noise components are cancelled is modulated with a signal from a second oscillator, to remove the standoff frequency. A band pass filter selects the appropriate side band from this modulator to produce an output signal corresponding to the information signal carrier and the original information thereon, compensated for the effects of wow and flutter by removal of the noise frequency components from the carrier.

The methods of the invention, and the manner in which it is preferred to practice them, together with the apparatus of the invention, the manner in which it is constructed, and its mode of operation, will best be understood in the light of the following detailed description, together with the accompanying drawings, illustrating various embodiments thereof.

Figures 1, 2:
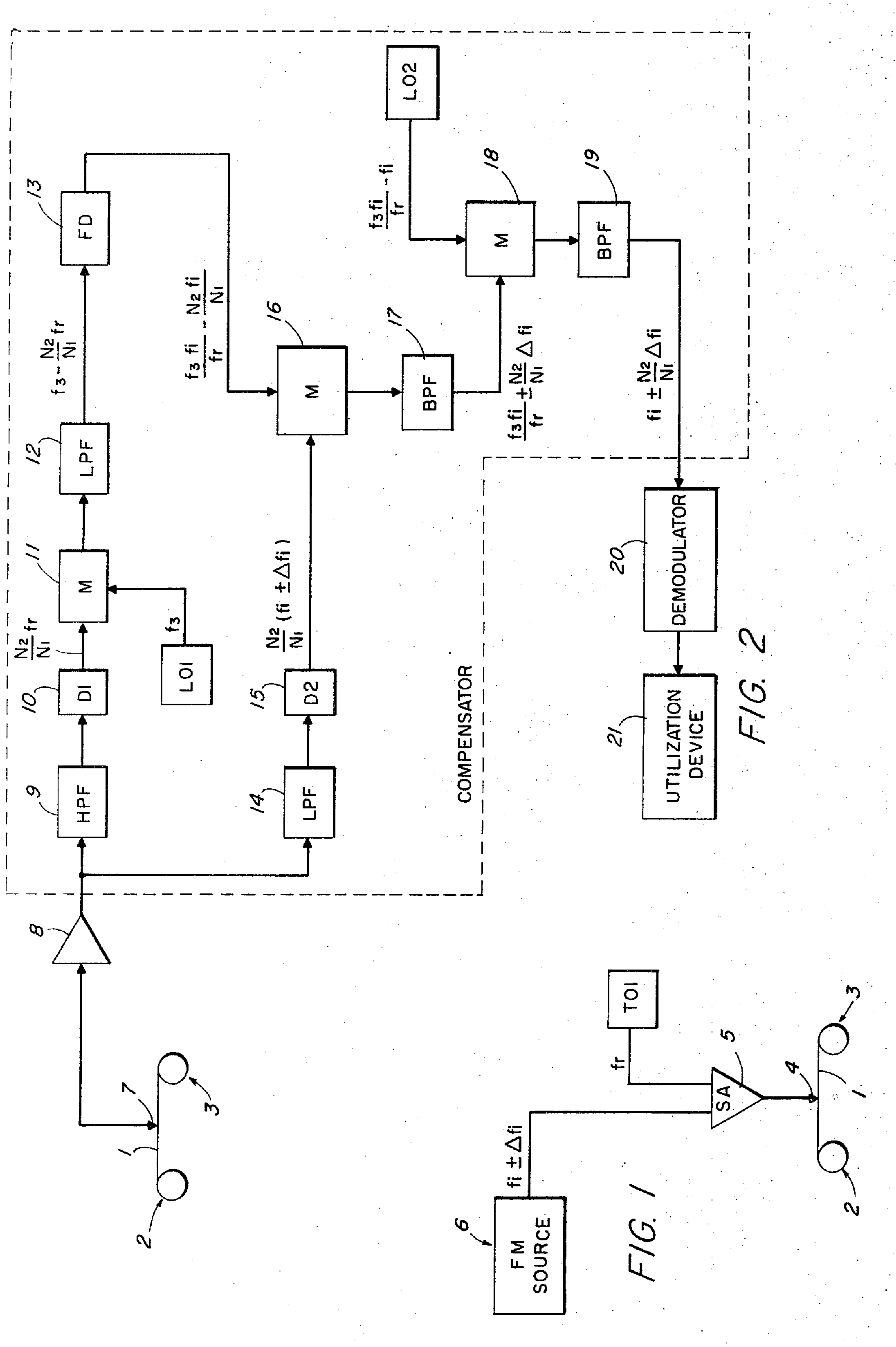
FIG. 1 is a schematic block diagram of apparatus for recording information in a manner suitable for use in the practice of the invention.
FIG. 2 is a schematic block and wiring diagram of an information reproducing system in accordance with the invention.

Referring to FIG. 1, there is shown a system for recording a frequency modulated information signal in superposition with a reference signal at a constant frequency. As will be apparent to those skilled in the art, various forms of records such as photosensitive sheets, magnetic tapes, discs, or mechanically modulated recording surfaces can be employed. For clarity, however, in order to illustrate the invention, reference will hereinafter be made particularly to recordings on magnetic tape, although no limitation is thereby intended. Thus the recording is schematically illustrated as being made on a magnetic tape schematically shown at 1 and disposed between a supply reel generally designated 2 and a takeup reel generally designated 3. A recording head 4 is supplied with signals from a summing amplifier 5 that receives a pilot frequency signal from a transmitter oscillator TO1. An information signal from a suitable source of frequency modulated signals 6 is also applied to the summing amplifier 5.

The source 6 may be a transducer mechanically or electrically coupled to a variable frequency oscillator, or other desired source of frequency modulated signals that has a center frequency $fi$ about which it is modulated by an amount $\pm \Delta fi$, so that the instantaneous frequency is the sum of the center frequency and its modulated component. If the relative speed between the head 4 and the tape 1 on the recorder is N1, then the reference frequency $fr$ will be recorded on the tape with a density D, expressed either in cycles per inch or bits per inch, of $fr$/N1. Similarly, the information signal will be recorded at a density of $(fi \pm \Delta fi)/N1$.

Referring to FIG. 2, the signal recorded on the tape 1 as described above may be reproduced by a head 7 and supplied to a conventional amplifier 8. The output terminal of the amplifier 8 is connected to a high pass filter 9. The filter 9 is designed to pass the reference frequency $fr$ with a sufficient pass band to accommodate deviations in that frequency which may arise due to playback speed.

Specifically, assuming that the playback head 7 is moved relative to the tape 1 at an instantaneous speed N2, then the reference frequency will be reproduced at a frequency N2 $fr$/N1. The pass band of the filter 9 should accept signals at frequencies corresponding to the maximum and minimum values of N1 and N2. The largest such frequency would be $N2_{max.}/N2_{min.}$, and the smallest would be $N2_{min.}/N2_{max.}$.

The output from the filter 9 will necessarily have some phase delay D1, here shown as deliberately provided by a conventional delay line 10. However, in practice it is preferred to design the high pass filter 9 such that its inherent delay is D1, which can be accomplished by conventional design techniques, and the delay line 10 is illustrated simply for expositary convenience in relating the delay in the reference channel network to a similar delay in the information signal channel, to be described.

The output of the delay line 10, or of the similarly delayed output of the high pass filter 9, is applied to a modulator 11 of any conventional construction in which it is modulated by a signal from a local oscillator LO1 at a fixed frequency $f3$. The frequency $f3$ differs from the frequency $fr$ by a convenient amount for the separation of the modulation side band, and is chosen to avoid interference with other frequency components in the system. For example, if the frequency $fr$ is 9 KHz, the frequency $f3$ may be 12 KHz. The modulator 11 may be, for example, an electronic switch which chops the frequency $fr$ at the rate $f3$.

The modulation products of the modulator 11 contain various frequency components, but in particular there are two relatively strong signal components at the sum and difference frequencies. It will be apparent to those skilled in the art from the description that follows that either side band would have utility, but in the particular embodiment illustrated the lower side band, centered in the example given at 3 KHz, is selected by a low pass filter 12.

The output of the filter 12, which has a frequency that may be expressed as $f3 - (N2\,fr/N1)$, is supplied to any conventional frequency divider 13 selected to divide the applied frequency by the factor $fr/fi$. For example, the divider 13 may be a binary counter adapted to divide by 3. The output of the counter 13 is accordingly a square wave having a fundamental frequency center at 1 KHz. The frequency of this signal is given by $[(f3\,fi)/fr] - [(N2\,fr\,fi)/(N1\,fr)] = [(f3\,fi)/fr] - [(N2 fi)/N1]$. The reproduced information signal from the amplifier 8 is selected by a low pass filter 14. The information signal frequency may be centered at, for example, 3 KHz. The filter 14 is associated with a delay D2, provided by the appropriate design of the filter network or, as shown, by a delay line 15, so that the information signal will be delayed in phase by an amount D2 equal to the delay D1 experienced by the reference frequency *fr*.

The output signal from the delay line 15, or the similarly delayed output of the filter 14, is applied to a conventional modulator 16 which may be of the same construction as the modulator 11. In the modulator 16, the output signal from the delay line 15 is modulated by the output signal from the frequency divider 13. Assuming that the frequency divider 13 is a binary counter, its essentially square wave output may be applied directly to an electronic switch to chop the information signal frequency and produce two side bands, comprising the sum and difference frequencies, in addition to other modulation products at lower amplitudes.

In the example given, the upper side band is selected by a band pass filter 17, which may have a pass band, for example, of 3 to 5 KHz. It will be apparent that the shifted carrier signal frequency *fi* has effectively been removed from the signal at the output of the band pass filter 17. There remains a standoff frequency component $(f3\,fi)/fr$ and the shifted information component $\pm(N2/N1)\ \Delta fi$. The standoff frequency component is next removed, and a center frequency component at the frequency *fi* reinserted, by a modulator 18 in which the output of the filter 17 is modulated by a local oscillator LO2 at a frequency $[(f3\,fi)/fr]=fi$. The lower side band of the modulation product of the modulator 18 is selected by a band pass filter 19, which may have a pass band of, for example, 2 KHz to 4 KHz. The frequency of the oscillator LO2 may be, for example, 1,000 Hz.

The output signal of the band pass filter 19 is now the desired information signal, compensated by the return of the center frequency to the recorded center frequency *fi*. It will be apparent that the information component is still shifted by the ratio *N*2/*N*1. Accordingly, it is clear that the maximum wow and flutter that can be tolerated is determined by the amount of distortion that this shift introduces.

For most purposes, it is readily possible to obtain speed control during recording and playback to well within 1 percent, without elaborate or expensive equipment. Such a 1 percent maximum shift could cause a maximum distortion of 1 percent in the informational component. However, that it is a considerable improvement over the distortion that would be experienced by the same frequency deviation in an uncompensated signal.

In particular, the percent error in an uncompensated signal would be $$E_u = 100\,\frac{(fi \pm \Delta fi)\left(1-\dfrac{N2}{N1}\right)}{\Delta fi},$$

based on the information content. On the same basis, the residual error in a signal compensated in accordance with the invention is $$E_c = 100\,\frac{(\Delta fi)\left(1-\dfrac{N2}{N1}\right)}{\Delta fi},$$

or $100\,([N1-N2/N1])$. A correction factor *Cf*, representing the improvement effected by the method of the invention, can thus be expressed as $Cf = E_u/E_c = (fi/\Delta fi) \pm 1$. Thus, if the modulation range is 10 percent of the carrier, for example, a correction factor of from 9 to 11 can be achieved.

The output signal from the band pass filter 19 may be applied to any conventional demodulator 20 suitable for transforming a frequency modulated signal into an output signal appropriate for any desired utilization device, shown in block diagram form at 21. For example, if the initial recorded signal is the output signal from a transducer, such as a pressure or temperature signal generator, the utilization device 21 might be a chart recorder.

It will be apparent from the above description that the apparatus of the invention is best adapted to the compensation of relatively narrow band signals on frequency modulated carriers, because the compensation effected is the shift of the carrier back to the original center frequency, and a residual distortion of the modulation component remains. As the variations in the signal approach the magnitude of the center frequency, the error in the compensated signal obviously becomes worse, and, in fact, approaches the error in an uncompensated signal. However, the method may be extended to cover broader band signals, which may be either amplitude or frequency modulated, by means of the apparatus shown in FIG. 3.

Figures 3, 4:
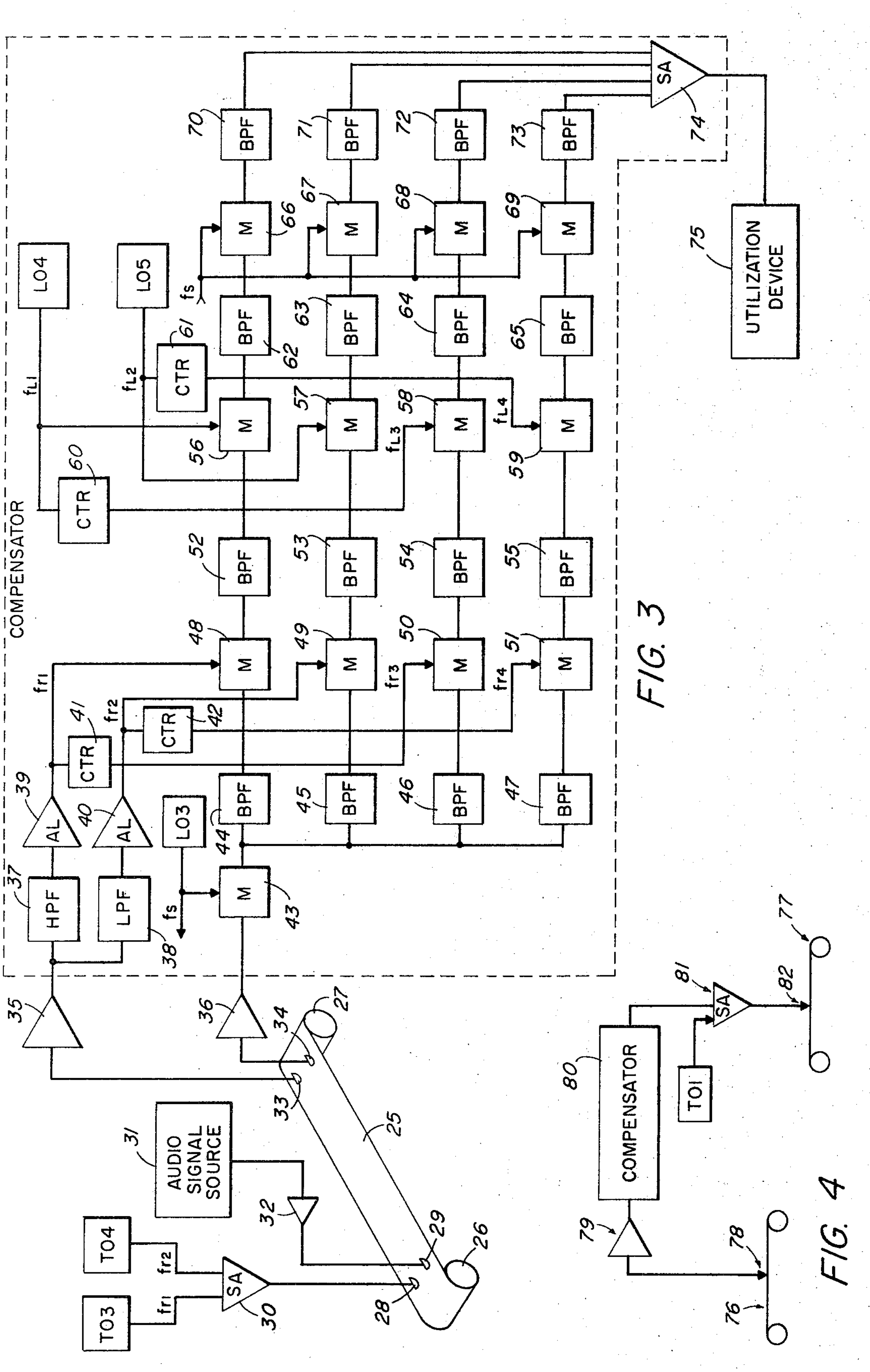
FIG. 3 is a schematic block and wiring diagram of an information recording and reproducing system in accordance with a modification of the invention.
FIG. 4 is a schematic block and wiring diagram of apparatus for re-recording a signal in accordance with the invention.

In FIG. 3, there is shown a magnetic tape 25 extending between a supply reel 26 and a takeup reel 27 and adapted to be driven onto the takeup reel from the supply reel by conventional means for recording and reproduction. Both recording and reproducing means are shown associated with the tape 25, and indeed for some purposes where a delayed effect is desired that may be done. However, it will be understood in general that recording is done at one time and reproduction at another.

Two recording heads 28 and 29 are shown adapted to simultaneously record signals on different tracks of the tape 25. The head 28 receives signals from a summing amplifier 30 that combines the output signals from two transmitter oscillators TO3 and TO4. These signals are constant frequency alternating voltages at frequencies *fr*1 and *fr*2, respectively, separated from each other by an amount selected in dependence on considerations to be described, and in the band of information signal frequencies to be recorded and reproduced.

The head 29 receives information signals from an amplifier 32 in response to audio signals provided by a suitable source 31. The source 31 may be any suitable source of audio signals having a frequency content in a selected band of a width determined by considerations to appear in dependence on the amount of wow and flutter expected in the recording and reproducing apparatus to be employed, and the tolerance to deviations in the compensated signal that is acceptable for a particular application. These signals may be considered to vary over a band including a lowest frequency *fo* and a maximum frequency *fm*.

Two playback heads 33 and 34 are arranged to be disposed adjacent the tape 25 to reproduce signals recorded by the heads 28 and 29, respectively. The head 33 responds to reference signal frequencies and applies them as an imput signal to a conventional pre-amplifier 35. The information signal frequencies in the band *fo* to *fm* are reproduced by the head 34 and applied to a conventional amplifier 36.

The output signal from the amplifier 35 is applied to a high pass filter 37 in parallel with a low pass filter 38. The high pass filter 37 is selected to reject the lower of the two reference frequencies, and, for example, the frequency *fr*2, and to pass the higher frequency *fr*1. Similarly, the low pass filter 38 is designed to reject the frequency *fr*1 and pass the frequency *fr*2 and lower frequencies.

The output signals from the filters 37 and 38 are preferably applied to amplifier limiters 39 and 40, respectively, which may, for example, be Schmitt triggers, zero crossing detectors, or the like. The amplifiers 39 and 40 produce suitable square wave signals at the reference frequency rate, except as those may be shifted by speed differences between recording and playback and arising from wow, flutter, or other effects.

The output signals from the limiters 39 and 40 are applied to frequency dividers here shown as binary counters 41 and 42, respectively. The frequencies *fr*1 and *fr*2 are selected, and the division effected by the dividers 41 and 42 is selected, in order to provide a set of four reference frequencies centered at *fr*1, *fr*2, *fr*3, and *fr*4 suitable distributed in the band of signals *fo* through *fm* to be compensated so that they are separated by amounts suitable for the appropriate compensation of the components of the information signal in the band adjacent each reference frequency. This matter will be made clearer below in connection with a discussion of the operation of the system. It will be apparent from what follows that other divisions of the frequencies *fr*1, *fr*2, *fr*3, and *fr*4 could be effected to provide still other reference frequencies, so that an extended band of information signals could be compensated with closer spacing of the reference frequencies, and thereby a more accurate correction of the information for wow and flutter.

The information signal supplied by the amplifier 36 is applied to a modulator 43 of any conventional construction, in which the information is modulated by a local oscillator LO3 at a selected standoff frequency *fs*. The frequency *fs* is selected in a manner to be described below in connection with the operation of the apparatus, but in general may conveniently be above the other frequencies in the system. A particular example will be given below.

The modulator 43 may be of any conventional design, and its output may be hard-limited, if desired. However, the modulators 48, 49, 50, and 51, as well as the other modulators to be described in connection with FIG. 3, are chosen from those conventional varieties in which the amplitude of one of the applied signals is preserved, whereas the amplitude of the modulating signal need not be preserved.

In particular, the output of the filters 44, 45 46, and 47 may have widely varying amplitudes, including zero amplitude for some of the filters if there is no information content in that frequency band. The output of the modulator 48 to the band pass filter 52 should thus be proportional in amplitude to the amplitude of the output of the filter 44. Similarly, other modulators to be described which receive outputs from band pass filters and are modulated by reference frequency signals or by fixed frequency signals are selected to preserve the amplitude of the input signal from the filter.

Suitable gain correction may be included, of course, if so desired or needed. The essential criterion is that the relative amplitudes of the outputs of the filters 44 through 47 should be preserved in the final outputs. The output signal from the modulator 43 has an upper side band comprising the sum frequencies of the oscillator LO3 and the information signals in the band *fo* through *fm*. The upper side band is selected by four band pass filters 44, 45, 46, and 47, each designed to pass a different sub-band of the upper side band. In particular, the sub-bands passed by the filters 44, 45, 46, and 47 are each selected to be centered about a different one of the reference frequencies *fr*1, *fr*2, *fr*3, and *fr*4, or at least approximately centered about those frequencies, and not deviating in either direction from the reference frequency by more than is tolerable in the compensated output signal.

For recorded music, considerably more frequency distortion can be accepted in the upper frequencies, for example, in the range from 2,000 to 15,000 Hz, than in the lower range from 0 to 2,000 Hz. Accordingly, the upper bands corresponding to the frequencies *fr*1 and *fr*2 may be considerably broader than the lower bands corresponding to the lower frequencies *fr*3 and *fr*4. Where additional reference frequencies are selected by further division, the lower ones of the corresponding bands would be progressively narrower, for the same reason.

The output signals from the filters 44, 45, 46, and 47 are each applied to a different one of four conventional modulators 48, 49, 50, and 51, where they are modulated by the corresponding reference frequencies *fr*1, *fr*2, *fr*3, and *fr*4, respectively. The lower side band of each of the modulation products from the modulators 48 through 51 is selected by each of a set of band pass filters 52, 53, 54, and 55, respectively.

The output signals from the filters 52, 53, 54, and 55 are now compensated, but have center frequencies which depart from the center frequencies assigned to the original information. In order to remove the source distortions so introduced, the appropriate center frequency is first reinserted, and then the standoff frequency is removed. For that purpose, the outputs of the filters 52, 53, 54, and 55 are each applied to one of four conventional modulators 56, 57, 58, and 59, respectively.

In the modulator 56, the output signal from the filters 52 is modulated by a signal at a frequency *f*L1 from a local oscillator LO4. The frequency *f*L1 is selected to be equal to the recorded frequency *fr*1. Similarly, the output signal from the filter 53 is modulated in the modulator 57 by a frequency *f*L2 supplied by a local oscillator LO5. The frequency *f*L2 is selected to be equal to the recorded frequency *fr*2.

The output signals from the oscillators LO4 and LO5 are supplied to frequency dividers, here shown as a pair of binary counters 60 and 61, respectively. The counters 60 and 61 have the same dividing ratios as the counters 41 and 42, such that the produced frequencies *f*L3 and *f*L4 equal the center frequencies *fr*3 and *fr*4, respectively, that would be produced if the reference frequencies *fr*1 and *fr*2 were reproduced at exactly the speeds at which they were recorded. The signal *f*L3 modulates the output of the band pass filter 54 in the modulator 58, and signal $fL4$ modulates the output of the filter 55 in the modulator 59.

The upper side band produced by the modulators 56, 57, 58, and 59 is selected by a set of four band pass filters 62, 63, 64, and 65, respectively. The output signals from the filters 62, 63, 64, and 65 is modulated with a signal at the frequency $fs$ from the oscillator LO3 in four conventional modulators 66, 67, 68, and 69, respectively.

The lower side band of the modulation products of these modulators 66 through 69 is selected by four band pass filters 70, 71, 72, and 73, respectively. The output signals from the filters 70, 71, 72, and 73 now contain the compensated components of the audio input signal, and these may be applied in parallel to a summing amplifier 74 that will recombine them and produce a compensated output signal for application to any desired utilization device 75, such as a loudspeaker, graphic recorder, or other desired utilization device.

The operation of the apparatus of FIG. 3 will next be described in connection with the following heuristic and theoretical explanation of its mode of operation.

Assuming that the signals supplied to the recording heads 28 and 29 were recorded on the tape 25 at a speed N1 inches per second, and reproduced by the heads 33 and 34 at N2 inches per second, the signals produced by the amplifiers 35 would have a frequency content of $(N2\,fr1)/N1$ and $(N2\,fr2)/N1$. The amplifier 36 would produce a signal having a frequency range from $(N2\,fo)/N1$ to $(N2\,fm)/N1$.

The original recorded information signal may be considered to comprise four signal components, having amplitudes $a1$, $a2$, $a3$, and $a4$, of which any may be zero, and expressible as follows:

$a1\ (fr1 \pm \Delta f1)$ $a2\ (fr2 \pm \Delta f2)$ $a3\ (fr3 \pm \Delta f3)$ and $a4\ (fr4 \pm \Delta f4)$ where $fr1 + \Delta f1_{max.} = fm$ $fr1 - \Delta f1_{max.} = fr2 + \Delta f2_{max.}$ $fr2 - \Delta f2_{max.} = fr3 + \Delta f3_{max.}$ $fr3 - \Delta f3_{max.} = fr4 + \Delta f4_{max.}$ $fr4 - \Delta f4_{max.} = fo$ In particular, if $fr3 = (fr1)/2$ and $fr4 = (fr2)/2$, $fr1 + \Delta f1_{max.} = fm$ $fr1 - \Delta f1_{max.} = fr2 + \Delta f2_{max.}$ $fr2 - \Delta f2_{max.} = \tfrac{1}{2}\,fr1 + \Delta f3_{max.}$ $\tfrac{1}{2}\,fr1 - \Delta f3_{max.} = \tfrac{1}{2}\,fr2 + \Delta f4_{max.}$ $\tfrac{1}{2}\,fr2 - \Delta f4_{max.} = fo$ Then $\Delta f4_{max.} = \tfrac{1}{2}\,fr2 - fo$ $\Delta f3_{max.} = \tfrac{1}{2}\,fr1 - fr2 + fo$ $\Delta f2_{max.} = 2\,fr2 - fr1 - fo$ $\Delta f1_{max.} = 2\,fr1 - 3\,fr2 + fo$ and $3\,fr1 - 3\,fr2 + fo = fm$ $fr1 - fr2 = (fm - fo)/3$ Thus, if $fr1 = 8{,}000$ Hz $fr2 = 5{,}742$ Hz $fm - fo = 3(8{,}000 - 5{,}742) = 6{,}774$ Hz.

For example, an information signal band from 2,226 Hz to 9,000 Hz could be accommodated.

The output signals from the modulator 43 that are selected by the filters 44, 45, 46, and 47 can be respectively expressed as:

$a1[fs + (N2/N1)\,(fr1 \pm \Delta f1)]$ $a2[fs + (N2/N1)\,(fr2 \pm \Delta f2)]$ $$a3\left[fs + \frac{N2}{N1}\left(\frac{fr1}{2} \pm \Delta f3\right)\right]$$

and $$a4\left[fs + \frac{N2}{N1}\left(\frac{fr2}{2} \pm \Delta f4\right)\right]$$

The corresponding output from the modulator 48 selected by the filter 52 is given by:

$a1\,[fs + (N2/N1)\,fr1 \pm (N2/N1)\,\Delta f1 - (N2/N1)\,fr1] = a1\,(fs \pm (N2/N1)\,\Delta f1)$ Similarly, the outputs from the filters 53, 54, and 55 are, respectively, $a2(fs \pm (N2/N1)\,\Delta f2)$ $a3(fs \pm (N2/N1)\,\Delta f3)$ and $a4\ (fs \pm N2/N1\ \Delta f4)$, where the amplitudes $ai$ are *relatively* constant; i.e., if the output amplitude of the filter 45 is twice that of the filter 46, the output amplitude of the filter 53 should be twice that of the filter 54, etc., despite any change in amplitude levels that may occur by attenuation or gain restoral.

The outputs of the modulator 56 selected by the filter 62 is $a1(fs \pm (N2/N1)\,\Delta f1 + fL1) = a1(fs \pm (N2/N1)\,\Delta f1 + fr1)$, since $fL1 = fr1$. Similarly, the outputs of the modulator 57, 58, 59, selected by the filters 63, 64, and 65, respectively, are:

$a2(fs \pm (N2/N1)\,\Delta f2 + fr2)$ $a3(fs \pm (N2/N1)\,\Delta f3 + fr1/2)$ and $a4(fs \pm (N2/N1)\,\Delta f4 + fr2/2)$ The final outputs from the filters 70, 71, 72, and 73 are given by:

$a1(fr1 \pm (N2/N1)\,\Delta f1)$ $a2(fr2 \pm (N2/N1)\,\Delta f2)$ $a3(fr\tfrac{1}{2} \pm [N2/N1]\Delta f3)$ and $a4(fr2/2 \pm [N2/N1]\Delta f4)$ The maximum percent frequency errors in the compensated signals for the four sub-bands in the example given are $\pm$ 100 $(1 - [N2/N1]$ for each sub-band. In the particular example given above where the information covers the band from 2,226 Hz to 9,000 Hz, the four sub-bands are 2,226 through 3,516 Hz, 3,516 through 4,484 Hz, 4,484 through 7,000 Hz, and 7,000 through 9,000 Hz. The maximum errors for a 1 percent speed error are thus 6.45 Hz for the lowest band, 4.84 Hz for the next higher band, 12.58 Hz for the third band, and 10 Hz for the upper band. These errors are well within acceptable limits for sound signals, and considerably more bandspread could be used in the upper bands for most purposes, because considerable frequency shifts will pass unnoticed at the higher frequencies.

FIG. 4 illustrates an application of the methods and apparatus of the invention to the duplication of recordings from master recordings. Where it is desired to produce copies of an original recording, the effects of wow and flutter on a recorded signal are compounded by the successive recording, playback and rerecording stages.

FIG. 4 shows apparatus for minimizing these effects in transcribing from one recorder to another. More specifically, the apparatus comprises means for transforming signals recorded on a tape diagrammatically indicated at 76 onto a tape schematically indicated at 77.

Signals from the tape 76 are picked up by a playback head diagrammatically indicated at 78 and supplied to an amplifier schematically shown at 79. The output signals from the amplifiers 79 are supplied to a compensator 80, which may be of the form shown in FIG. 2. It will be apparent that the apparatus of FIG. 3 could also be employed, with additional channels to handle signals on separate tracks. The signals on the tape 76 are recorded together with one or more pilot tones for the purposes described above.

In the compensator 80, the frequency deviations produced during the recording and playback of the signals on the tape 76 are reduced, so that the output signals applied through a summing amplifier 81 to recording heads 82 may be recorded on a tape 77 with fidelity approaching that of the original recording on the tape 76. The summing amplifier 81 also receives a new pilot signal from a local oscillator TO1, in the manner and for the purposes described in connection with FIG. 1.

While the invention has been described with respect to the specific details of preferred embodiments thereof, many changes and variations will occur to those skilled in the art upon reading this description, and such can obviously be made without departing from the scope of the invention.

Having thus described the invention, what is claimed is:

1. In a frequency compensation system for recording and reproducing a frequency modulated carrier signal, first means for producing a reference signal at a predetermined frequency, means for recording the modulated carrier signal and said reference signal simultaneously, means for simultaneously reproducing said recorded signals, means for separating the reproduced carrier signal and the reproduced reference signal, means for modulating one of said reproduced signals with a third signal at a fixed frequency to produce a first side band signal, and means for modulating said first side band signal with said other reproduced signal to produce a second side band signal having a center frequency with a fixed relationship to said predetermined frequency.

2. Apparatus for compensating a first signal, comprising an information component modulated on a carrier, for frequency deviations with the aid of a second signal having analogous frequency deviations, comprising means for combining one of said first and second signals with a signal at constant frequency to produce a first control signal containing a frequency component corresponding to said carrier and its frequency deviations and a standoff frequency component, means for combining the other of said first and second signals with said control signal to produce a second control signal at a fixed frequency modulated by said information component, and means for combining said second control signal with a signal at a fixed frequency to produce an output signal at the frequency of said carrier modulated by said information component.

3. Apparatus for reproducing an information signal from a record on which a reference signal has been recorded with the information signal, said information signal comprising an information component modulated on a carrier component having a first frequency, said reference signal having a second frequency, said apparatus comprising reproducing means for simultaneously reproducing said information signal and said reference signal, means for combining one of said reproduced signals with a signal at a third fixed frequency to produce a control signal at a frequency determined by said third frequency and the carrier component of said reproduced information signal, means for combining said control signal with the other of said reproduced signals to produce an intermediate signal comprising a fixed frequency modulated by the information component in said reproduced information signal, and means for combining said intermediate signal with a signal at a fixed frequency determined by said first frequency and said fixed frequency component of said intermediate signal to produce an output signal at a frequency equal to said first frequency modulated by the information component of said reproduced information signal.

4. The method of recording and reproducing a frequency modulated information signal having a frequency modulated about a first frequency with an information component, comprising the steps of producing a reference signal at a second frequency, simultaneously recording said information signal and said reference signal on a record, simultaneously reproducing said reference signal and said information signal from said record, combining the reproduced reference signal with a third signal to produce a first control signal having a frequency component corresponding to the reproduced reference signal and a standoff frequency component, dividing the frequency of said first control signal by the ratio of said second frequency to said first frequency to produce a second control signal having a frequency component corresponding to the carrier component of the reproduced information signal, combining said second control signal with the reproduced information signal to produce an intermediate signal at a fixed frequency modulated by the information component of the reproduced information signal, and combining the intermediate signal with a signal at another fixed frequency to produce an output signal modulated about said first frequency with the information component of the reproduced reference signal.

5. A frequency compensation system, comprising means for simultaneously reproducing an information signal and a reference signal from a record on which said signals were simultaneously recorded, said reproduced information signal having a frequency $(fi \pm \Delta fi)(N_2/N_1)$, where $fi$ is a carrier frequency, $\Delta fi$ is an information component modulated on said carrier frequency, $N_2$ is the speed at which said signals are reproduced, and $N_1$ is the speed at which said signals were recorded, and said reproduced reference signal having a frequency $fr(N_2/N_1)$, means for producing a second reference signal at a frequency $f_3$, first modulating means responsive to said second reference signal for modulating said reproduced reference signal to produce a first output signal, frequency dividing means responsive to an applied signal for producing an output signal at a frequency equal to $fi/fr$ times the frequency of the applied signal, filter means responsive to said first output signal for applying a signal to said frequency dividing means at a frequency $f_3-(N_2/N_1) fr$ to cause said frequency dividing means to produce an output signal at a frequency $(f_3fi/\mathrm{fr}) - (N_2fi/N_1)$, second modulating means responsive to said reproduced information signal and the output signal from said frequency dividing means for producing an output signal at a frequency equal to $(f_3fi/fr) \pm (N_2/N_1) \Delta fi$, means for producing a third reference signal at a frequency $(f_3fi/fr)-fi$, and third modulating means responsive to said third reference signal and to the output signal from said second modulating means for producing an output signal at a frequency $fi \pm (N_2/N_1) \Delta fi$.

6. Apparatus for compensating an information signal reproduced from a record for errors in frequency with the aid of a reference signal simultaneously reproduced from the same record and having proportional errors in frequency, comprising means for deriving a control signal from said reference signal in which the frequency errors are substantially equal in amplitude to the errors in said information signal, and means for combining said information signal with said control signal to produce an output signal in which said errors are cancelled.

7. Apparatus for compensating a frequency modulated information signal reproduced from a record for errors in frequency with the aid of a reference signal simultaneously reproduced from the same record and having proportional errors in frequency, comprising means for deriving a control signal from said reference signal in which the frequency errors are substantially equal in amplitude to the errors in said information signal, means for modulating said information signal with said control signal to produce a signal comprising a first side band in which the errors are doubled and a second side band in which the errors are cancelled, an output terminal, and filter means responsive to said modulating means for selectively applying said second side band to said output terminal.

8. Apparatus for compensating an information signal frequency modulated about a first frequency for errors in frequency with the aid of a reference signal having proportional errors in frequency about a second frequency, comprising means for multiplying said reference frequency by the ratio of said first frequency to said second frequency to produce a control signal in which the frequency errors are approximately equal in amplitude to the errors in said information signal, means for modulating said information signal with said control signal to produce a signal comprising a first side band in which the errors are doubled and a second side band in which the errors are cancelled, an output terminal, and means responsive to said modulating means for selectively applying said second side band to said output terminal.

9. Apparatus for compensating a frequency modulated information signal for errors in center frequency from a first frequency with the aid of a reference signal having proportional errors in frequency from a second frequency, comprising means for producing a first standoff signal at a fixed third frequency, means for combining said reference signal and said first standoff signal to produce a first control signal at a frequency offset from the frequency of said reference signal, means fo multiplying said first control signal by the ratio of said first frequency to said second frequency to produce a second control signal offset from said first frequency and containing frequency errors approximately equal in amplitude to the errors in said information signal, means for combining said information signal and said second control signal to produce an intermediate signal offset from said first frequency in which said errors are cancelled, means for producing a second standoff signal at a fixed fourth frequency determined by said first, second and third frequencies to differ from the frequency of said intermediate signal by said first frequency, and means for combining said second standoff signal and said intermediate signal to produce a compensated output signal.

10. The apparatus of claim 8, in which said means for producing said first control signal comprises modulating means responsive to said reference signal and said first standoff signal for producing a signal containing first and second side bands and filter means responsive to said modulating means for selectively producing said first side band as said first control signal.

11. The apparatus of claim 10, in which said means for combining said information signal and said second control signal comprises second modulating means for producing a signal containing upper and lower side bands, and filter means responsive to said second modulating means for selectively producing, as said intermediate signal, said upper or said lower side band, respectively, in dependence on whether said first side band is lower or higher in frequency than said second side band, respectively.

12. Apparatus for recording on a second record an information signal recorded on a first record simultaneously with a reference signal, comprising reproducing means for simultaneously reproducing said signals from said first record, signal generating means controlled by said reproducing means and selectively responsive to said reproduced reference signal for producing a control signal from said reproduced reference signal in which frequency errors due to wow and flutter are substantially equal in amplitude to corresponding wow and flutter errors in said reproduced information signal, means responsive to said control signal and selectively responsive to the information signal reproduced by said reproducing means for combining said reproduced information signal with said control signal to produce an output signal in which said errors are cancelled, means for producing a second reference signal at constant frequency, and recording means for simultaneously recording said output signal and said second reference signal on said second record.

13. Apparatus for recording on a second record a frequency modulated information signal recorded on a first record simultaneously with a reference signal, comprising reproducing means for simultaneously reproducing said signals from said first record, signal generating means controlled by said reproducing means and selectively responsive to said reproduced reference signal for producing a control signal from said reproduced reference signal in which frequency errors due to wow and flutter are substantially equal in amplitude to corresponding frequency errors in said reproduced information signal, means responsive to said control signal and selectively responsive to the information signal reproduced by said reproducing means for modulating said reproduced information signal with said control signal to produce a signal comprising a first side band in which the errors are doubled and a second side band in which the errors are cancelled, an output terminal, filter means responsive to said modulating means for selectively applying said second side band to said output terminal, oscillator means for producing a second reference signal, and recording means connected to said output terminal and to said oscillator means for simultaneously recording said second side band and said second reference signal on said second record.

14. Apparatus for recording on a second record a frequency modulated information signal having a first center frequency and recorded on a first record simultaneously with a reference signal having a second frequency, comprising reproducing means for simultaneously reproducing said signals from said first record, multiplying means controlled by said reproducing means and selectively responsive to said reproduced reference signal for multiplying the frequency of said reproduced reference signal by the ratio of said first frequency to said second frequency to produce a control signal in which frequency errors due to wow and flutter are approximately equal in amplitude to the errors in said reproduced information signal, means for modulating said reproduced information signal with said control signal to produce a signal comprising a first side band in which the errors are doubled and a second side band in which the errors are cancelled, an output terminal, means responsive to said modulating means for selectively applying said second side band to said output terminal, oscillator means for producing a second reference signal, and recording means connected to said output terminal and to said oscillator means for simultaneously recording said second side band and said second reference signal on said second record.

15. Apparatus for recording on a second record a frequency modulated information signal having a first center frequency recorded on a first record simultaneously with a reference signal at a second frequency, comprising reproducing means for simultaneously reproducing said signals from said first record, means for producing a first standoff signal at a fixed third frequency, means responsive to said standoff signal and selectively responsive to said reproducing means for combining said reference signal and said first standoff signal to produce a first control signal at a frequency offset from the frequency of said reference signal, means for multiplying said control signal by the ratio of said first frequency to said second frequency to produce a second control signal offset from said first frequency and containing frequency errors due to wow and flutter approximately equal in amplitude to the corresponding errors in said information signal, means for combining said information signal and said second control signal to produce an intermediate signal offset from said first frequency in which said errors are cancelled, means for producing a second standoff signal at a fixed fourth frequency determined by said first, second and third frequencies to differ from the frequency of said intermediate signal by said first frequency, means for combining said second standoff signal and said intermediate signal to produce a compensated output signal, means for producing a second reference signal at constant frequency, and recording means for simultaneously recording said compensated output signal and said second reference signal on said second record.

16. The process of recording and reproducing an information signal having at least one frequency component in one of first and second sub-bands in a predetermined band, comprising the steps of recording said information signal simultaneously with at least one reference signal at a constant frequency, simultaneously reproducing said signals, shifting the frequency of said information signal by a first fixed amount in a predetermined phase, separating said frequency shifted information signal into at least two sub-bands to produce first and second component signals at least one of which has an amplitude greater than zero and each differing from a different one of said first and second sub-bands by said first fixed amount, deriving at least two signals from the reproduced reference signal at different frequencies each centered in one of said first and second sub-bands, reducing the frequency of each of said component signals by an amount equal to the frequency of the derived reference signal centered in the sub-band from which it was produced to produce first and second compensated signals in which wow and flutter errors introduced in recording and reproduction are approximately cancelled, increasing the frequency of each of said compensated signals by one of a set of second fixed amounts equal to the center frequency in the sub-band from which it was produced to produce first and second intermediate signals, shifting the frequencies of said intermediate signals by said first fixed amount in a sense opposite said predetermined sense to produce third and fourth compensated signals having amplitudes proportional to the amplitudes of said first and second component signals and frequencies in said first and second sub-bands, and summing said third and fourth signals to produce a compensated output signal.

17. In combination, means for simultaneously reproducing an information signal having a frequency in a predetermined range and a reference signal from a record on which said signals have been simultaneously recorded, means for modulating said reproduced information signal at a first fixed frequency to produce a first modulated signal, means selectively responsive to said first modulated signal for producing a first side band signal, means responsive to said reproduced reference signal for modulating said first side band signal at a frequency varying with the frequency of said reproduced reference signal and at least approximately centered in said predetermined range to produce a second modulated signal, means selectively responsive to said second modulated signal for producing a second side band signal in which wow and flutter errors are approximately cancelled, means for modulating said second side band signal at a second fixed frequency equal to the center frequency at which said first side band signal was modulated to produce a third modulated signal, means selectively responsive to said third modulated signal for producing a third side band signal, means for modulating said third side band signal at said first fixed frequency to produce a fourth modulated signal, and means selectively responsive to said fourth modulated signal for producing an output signal at the frequency of said recorded information signal.

18. Apparatus for reproducing an information signal having frequencies in a predetermined range, said information signal having been recorded on a record simultaneously with at least two reference signals at different fixed frequencies, comprising reproducing means for simultaneously reproducing said information signal and said reference signals, first modulating means for modulating said reproduced information signal at a constant standoff frequency to produce a first modulated signal, first, second, third and fourth band pass filters connected to said first modulating means for producing from said first modulated signal first, second, third and fourth side band signals each having frequencies offset from a different sub-band of said range by said standoff frequency, said sub-bands collectively covering said range, means selectively responsive to said reproducing means for separately producing said first reproduced reference signal, means selectively responsive to said reproducing means for separately producing said second reproduced reference signal, second modulating means responsive to said first reproduced reference signal for modulating said first side band signal at a frequency approximately centered in the sub-band of said first component signal and varying in accordance with wow and flutter variations in said first reproduced reference signal to produce a fifth modulated signal, third modulating means responsive to said second reproduced reference signal for modulating said second side band signal at a frequency approximately centered in the sub-band of said second component signal and varying in accordance with wow and flutter variations in said second reproduced reference signal to produce a sixth modulated signal, first dividing means responsive to said first reproduced reference signal for producing a first derived reference signal at a predetermined fraction of the frequency of said first reproduced reference signal and approximately centered in the sub-band of said third component signal, fourth modulating means for modulating said third side band signal at the frequency of said first derived reference signal to produce a seventh modulated signal, second dividing means responsive to said second reproduced reference signal for producing a second derived reference signal at a predetermined fraction of the frequency of said second reproduced reference signal and approximately centered in the sub-band of said fourth component signal, fifth modulating means for modulating said fourth side band signal at the frequency of said second derived reference signal to produce an eighth modulated signal, means selectively responsive to said fifth, sixth, seventh and eighth modulated signals, respectively, for producing fifth, sixth, seventh and eighth side band signals, respectively, each shifted from the frequency of the corresponding first, second, third and fourth side band signal in a sense opposite said shift from said standoff frequency, means for producing first, second, third and fourth fixed reference signals at frequencies equal, respectively, to the frequency at which said first reference signal was recorded, the frequency at which said second reference signal was recorded, the fraction of the frequency at which said first reference signal was recorded produced by said first dividing means, and the fraction of the frequency at which said second reference signal was recorded produced by said second dividing means, sixth modulating means for modulating said fifth side band signal at the frequency of said first fixed reference signal to produce a ninth modulated signal, seventh modulating means for modulating said sixth side band signal at the frequency of said second fixed reference signal to produce a 10th modulated signal, eighth modulating means for modulating said seventh side band signal at the frequency of said third fixed reference signal to produce an 11th modulated signal, ninth modulating means for modulating said eighth side band signal at the frequency of said fourth fixed reference signal to produce a 12th modulated signal, means selectively responsive to said ninth, 10th, 11th and 12th modulated signals for producing ninth, 10th, 11th and 12th side band signals, respectively, each shifted from the frequency of the corresponding fifth, sixth, seventh and eighth side band signal in the same sense as said shift from said standoff frequency, 10th, 11th, 12th and 13th modulating means for modulating said ninth, 10th, 11th and 12th side band signals at said standoff frequency to produce 13th, 14th, 15th and 16th modulated signals, respectively, means selectively responsive to said 13th, 14th, 15th and 16th modulated signals for producing 13th, 14th, 15th and 16th side band signals at frequencies in the sub-bands of said first, second, third and fourth component signals, respectively, and summing means responsive to said 13th, 14th, 15th and 16th side band signals for producing an output signal.

19. Apparatus for compensating an information signal centered at a first frequency for frequency deviations with the aid of a reference signal at a second frequency and having proportional frequency deviations, comprising signal generating means responsive to the reference signal for producing a control signal at a frequency offset by a fixed amount from said second frequency and containing at least a reference signal component that is divided by the ratio of said second frequency to said first frequency, means controlled by said signal generating means and responsive to the information signal for mixing the information signal with the control signal to produce a modulated signal containing a side band in which said frequency deviations are substantially cancelled, means selectively responsive to said modulated signal for producing a side band signal at the frequency of said side band, and means for offsetting the frequency of said side band signal to produce a compensated information signal centered at said first frequency.

20. Apparatus for compensating an information signal recorded on a record medium simultaneously with a reference signal, comprising means for simultaneously reproducing said recorded signals, a first modulator responsive to two applied signals for producing a modulated signal comprising signal components having frequencies equal to the sum and difference of the frequencies of the applied signals, a first channel comprising a first filter having a first delay connected between said reproducing means and said first modulator and selectively responsive to a first of said recorded signals for applying a first signal to said first modulator at a frequency at least proportional to the frequency of said first recorded signal, a second channel comprising a second filter selectively responsive to said other recorded signal and having a delay equal to said first delay and a second modulator, said second channel being connected between said reproducing means and said first modulator for applying a second signal to said first modulator.

21. In apparatus for compensating an information signal for wow and flutter deviations with the aid of a reference signal having wow and flutter deviations proportional to the deviations in said reference signal and in time correspondence therewith, a first signal processing channel having a first delay for modifying the center frequency of the wow and flutter deviations in one of said signals to make them approximately equal to the wow and flutter deviations in the other signal, a second signal processing channel having a delay equal to said first delay for transmitting the other signal, means in one of said channels for offsetting the center frequency of the signal in the channel without modifying the frequency of the wow and flutter components thereof, modulating means controlled by both of said channels for modulating one of said signals with the other signal and producing a modulated output signal containing at least upper and lower side bands at sum and different frequencies determined by the output signals of said channels, and filter means for producing an output signal in accordance with one of said side band signals.

22. In a frequency compensation system for recording and reproducing a frequency modulated carrier signal, first means for producing a reference signal at a predetermined frequency, means for recording the modulated carrier signal and said reference signal simultaneously, means for simultaneously reproducing said recorded signals, first filter means selectively responsive to a first of said reproduced signals for producing a first delayed signal, second filter means selectively responsive to the second of said reproduced signals for producing a second delayed signal, said delayed signals being equally delayed relative to said reproduced signals, means for modulating one of said reproduced signals with a third signal at a fixed frequency to produce a first side band signal, and means for modulating said first side band signal with said other reproduced signal to produce a second side band signal having a center frequency with a fixed relationship to said predetermined frequency.

23. Apparatus for compensating a first signal, comprising an information component modulated on a carrier, for frequency deviations with the aid of a second signal having analogous frequency deviations, comprising first circuit means having a first delay for combining one of said first and second signals with a signal at constant frequency to produce a first control signal containing a frequency component corresponding to said carrier and its frequency deviations and a standoff frequency component, second circuit means having a delay equal to said first delay for producing a delayed signal in accordance with the other of said first and second signals, means for combining said delayed signal with said control signal to produce a second control signal at a fixed frequency modulated by said information component, and means for combining said second control signal with a signal at a fixed frequency to produce an output signal at the frequency of said carrier modulated by said information component.

24. Apparatus for reproducing an information signal from a record on which a reference signal has been recorded with the information signal, said information signal comprising an information component modulated on a carrier component having a first frequency, said reference signal having a second frequency, said apparatus comprising reproducing means for simultaneously reproducing said information signal and said reference signal, first circuit means having a first delay for combining one of said reproduced signals with a signal at a third fixed frequency to produce a control signal at a frequency determined by said third frequency and the carrier component of said reproduced information signal, second circuit means having a delay equal to said first delay for producing a delayed signal in accordance with the other of said reproduced signals, means for combining said control signal with said delayed signal to produce an intermediate signal comprising a fixed frequency modulated by the information component in said reproduced information signal, and means for combining said intermediate signal with a signal at a fixed frequency determined by said first frequency and said fixed frequency component of said intermediate signal to produce an output signal at a frequency equal to said first frequency modulated by the information component of said reproduced information signal.

25. The method of recording and reproducing a frequency modulated information signal having a frequency modulated about a first frequency with an information component, comprising the steps of producing a reference signal at a second frequency, simultaneously recording said information signal and said reference signal on a record, simultaneously reproducing said reference signal and said information signal from said record, separating said reproduced signals with filters having matched delays, combining the separated and delayed reference signal with a third signal to produce a first control signal having a frequency component corresponding to the reproduced reference signal and a standoff frequency component, dividing the frequency of said first control signal by the ratio of said second frequency to said first frequency to produce a second control signal having a frequency component corresponding to the carrier component of the reproduced information signal, combining said second control signal with the separated and delayed information signal to produce an intermediate signal at a fixed frequency modulated by the information component of the reproduced information signal, and combining the intermediate signal with a signal at another fixed frequency to produce an output signal modulated about said first frequency with the information component of the reproduced reference signal.

26. A frequency compensation system, comprising means for simultaneously reproducing an information signal and a reference signal from a record on which said signals were simultaneously recorded, said reproduced information signal having a frequency $(fi \pm \Delta fi)(N_2/N_1)$, where $fi$ is a carrier frequency, $\Delta fi$ is an information component modulated on said carrier frequency, $N_2$ is the speed at which said signals are reproduced, and $N_1$ is the speed at which said signals were recorded, and said reproduced reference signal having a frequency $fr\ (N_2/N_1)$, filter means having matched delays for separating said reproduced signals while preserving their time correspondence, means for producing a second reference signal at a frequency $f_3$, first modulating means responsive to said second reference signal for modulating said separated reference signal to produce a first output signal, frequency dividing means responsive to an applied signal for producing an output signal at a frequency equal to $fi/fr$ times the frequency of the applied signal, filter means responsive to said first output signal for applying a signal to said frequency dividing means at a frequency $f_3-(N_2/N_1)$ fr to cause said frequency dividing means to produce an output signal at a frequency $(f_3fi/fr) - (N_2fi/N_1)$, second modulating means responsive to said separated information signal and the output signal from said frequency dividing means for producing an output signal at a frequency equal to $(f_3fi/fr) \pm (N_2/N_1)\ \Delta fi$, means for producing a third reference signal at a frequency $(f_3fi/fr) - fi$, and third modulating means responsive to said third reference signal and to the output signal from said second modulating means for producing an output signal at a frequency $fi \pm (N_2/N_1)\ \Delta fi$.

27. Apparatus for compensating an information signal reproduced from a record for errors in frequency with the aid of a reference signal simultaneously reproduced from the same record and having proportional errors in frequency, comprising means for deriving a delayed control signal from said reference signal in which the frequency errors are substantially equal in amplitude to the errors in said information signal and having a first delay, means for delaying said information signal by an amount equal to said first delay, and means for combining said delayed information signal with said control signal to produce an output signal in which said errors are cancelled.

28. Apparatus for compensating a frequency modulated information signal reproduced from a record for errors in frequency with the aid of a reference signal simultaneously reproduced from the same record and having proportional errors in frequency, comprising filter means having matched delays for separating said reproduced signals to produce a delayed information signal and a correspondingly delayed reference signal, means for deriving a control signal from said delayed reference signal in which the frequency errors are substantially equal in amplitude to the errors in said information signal, means for modulating said delayed information signal with said control signal to produce a signal comprising a first side band in which the errors are doubled and a second side band in which the errors are cancelled, an output terminal, and filter means responsive to said modulating means for selectively applying said second side band to said output terminal.

29. Apparatus for recording on a second record a frequency modulated information signal having a first center frequency and recorded on a first record simultaneously with a reference signal having a second frequency, comprising reproducing means for simultaneously reproducing said signals from said first record, filter means having matched delays controlled by said reproducing means for separating said reference signal from said information signal while maintaining the time correspondence of said signals, multiplying means controlled by said reproducing means and selectively responsive to said separated and delayed reference signal for multiplying the frequency of said separated and delayed reference signal by the ratio of said first frequency to said second frequency to produce a control signal in which frequency errors due to wow and flutter are approximately equal in amplitude to the errors in said reproduced information signal, means for modulating said separated and delayed information signal with said control signal to produce a signal comprising a first side band in which the errors are doubled and a second side band in which the errors are cancelled, an output terminal, means responsive to said modulating means for selectively applying said second side band to said output terminal, oscillator means for producing a second reference signal, and recording means connected to said output terminal and to said oscillator means for simultaneously recording said second side band and said second reference signal on said second record.

30. In a frequency compensation system for recording and reproducing a frequency modulated carrier signal, first means for producing a reference signal at a predetermined frequency, means for recording the modulated carrier signal and said reference signal simultaneously, means for simultaneously reproducing said recorded signals, matched filtering means for separating the reproduced carrier signal and the reproduced reference signal while preserving the time correspondence therebetween, means for modulating one of said separated signals with a third signal at a fixed frequency to produce a first side band signal, and means for modulating said first side band signal with said other separated signal to produce a second side band signal having a center frequency with a fixed relationship to said predetermined frequency.

31. Apparatus for compensating an information signal, comprising an information component modulated on a carrier, for frequency deviations with the aid of a reference signal having analogous frequency deviations, comprising a first signal processing channel selectively responsive to a first of said signals, means in said first channel for combining said first signal with a signal at constant frequency to produce a first control signal containing a frequency component corresponding to said carrier and its frequency deviations and a standoff frequency component, a second signal processing channel selectively responsive to the second of said information and reference signals, means for combining said second signal with said control signal to produce a second control signal at a fixed frequency modulated by said information component, said channels having equal time delays, and means for combining said second control signal with a signal at a fixed frequency to produce an output signal at the frequency of said carrier modulated by said information component.

* * * * *